F. ENGEL.
METHOD OF CASTING.
APPLICATION FILED SEPT. 19, 1910.

1,235,778.

Patented Aug. 7, 1917.
5 SHEETS—SHEET 1.

Witnesses:
Arthur Carlson
Geo. B. Jones.

Inventor
Frank Engel
By Edwin A. H. Tower Jr.
Atty

F. ENGEL.
METHOD OF CASTING.
APPLICATION FILED SEPT. 19, 1910.

1,235,778.

Patented Aug. 7, 1917.
5 SHEETS—SHEET 3.

Witnesses:
Arthur Carlson
Geo. B. Jones

Inventor
Frank Engel
By: Edwin B. H. Tower Jr.
Atty.

F. ENGEL.
METHOD OF CASTING.
APPLICATION FILED SEPT. 19, 1910.
1,235,778.
Patented Aug. 7, 1917.
5 SHEETS—SHEET 4.
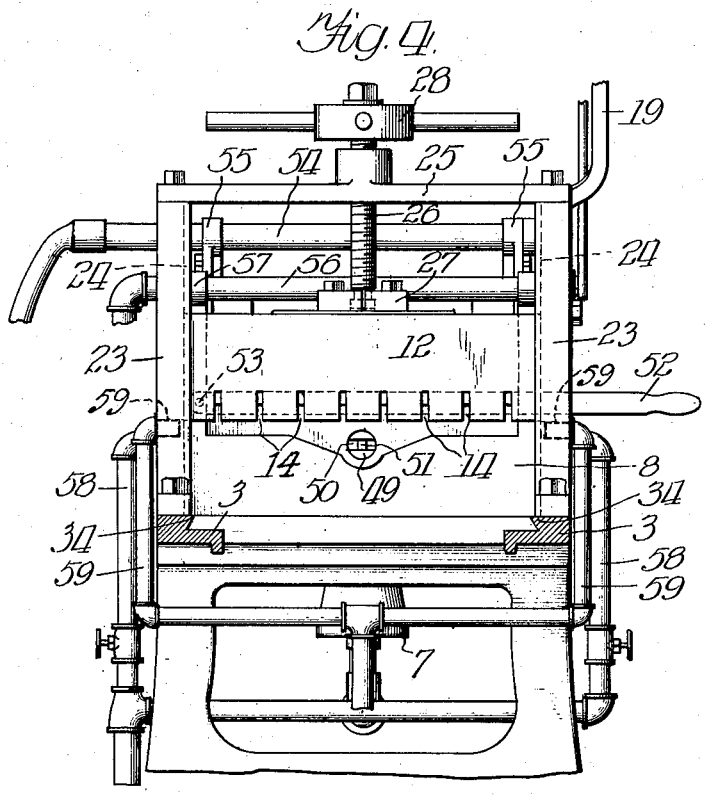
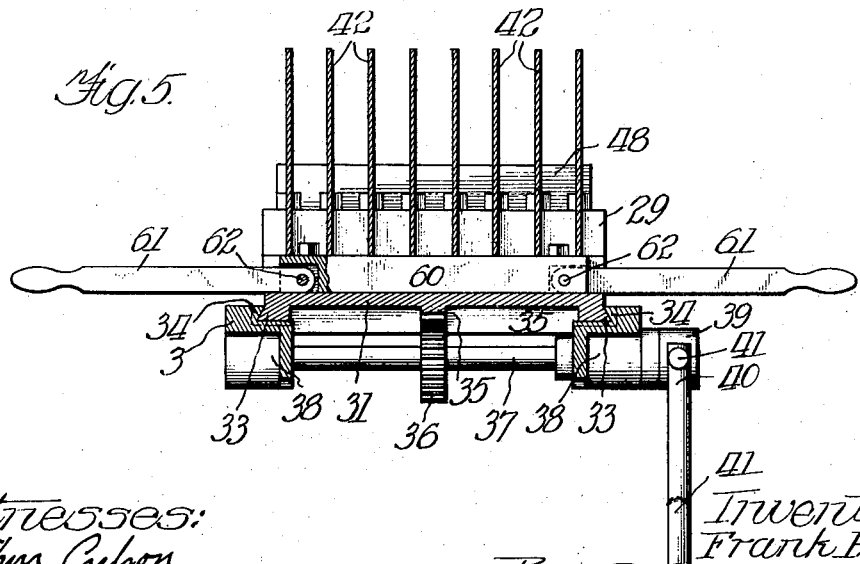
Witnesses:
Arthur Carlson
Inventor:
Frank Engel

F. ENGEL.
METHOD OF CASTING.
APPLICATION FILED SEPT. 19, 1910.

1,235,778.

Patented Aug. 7, 1917.
5 SHEETS—SHEET 5.

Witnesses:
Arthur Carlson.
Geo. B. Jones.

Inventor:
Frank Engel
By Edwin B. H. Tower
Atty.

UNITED STATES PATENT OFFICE.

FRANK ENGEL, OF BUFFALO, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

METHOD OF CASTING.

1,235,778.

Specification of Letters Patent.

Patented Aug. 7, 1917.

Application filed September 19, 1910. Serial No. 582,696.

*To all whom it may concern:*

Be it known that I, FRANK ENGEL, a citizen of the United States, residing at Buffalo, in the county of Erie and State of New York, have invented new and useful Improvements in Methods of Casting, of which the following is a full, clear, concise, and exact description, reference being had to the accompanying drawing, forming a part of this specification.

My invention relates to a process for connecting a group of battery plates to form an integral structure.

One of the objects of the invention is to mechanically and electrically connect a number of storage battery plates by a conducting member, which shall be joined to each individual plate in such a manner as to be substantially integral therewith, whereby good mechanical strength and electrical conductivity are secured.

Various attempts have been made in the past to connect storage battery plates by "burning" a common connecting member to a number of plates. In this process, the various parts were connected by directing a flame against their adjacent surfaces, causing a partial fusion of the metal so that the resulting structure had a continuous outer surface of conducting metal, but within the joint was very incomplete and needed only to be cut into to reveal the imperfections. By my improved process, the juncture of the various parts is so complete that, upon being cut open, no trace of a joint can be found.

While my improved process may be carried out in a number of ways by a variety of machines, I have illustrated, in the accompanying drawings, one form of machine which accomplishes the result in a satisfactory manner, although it is to be understood that other instrumentalities may be combined and arranged to secure substantially the same result.

In the drawings:—

Figure 1 is a longitudinal elevation of the machine referred to;

Fig. 4 is a section on line 4—4 of Fig. 1;

Fig. 5 is a section on line 5—5 of Fig. 1;

Fig. 6 is a perspective view of a detail;

Figure 1:
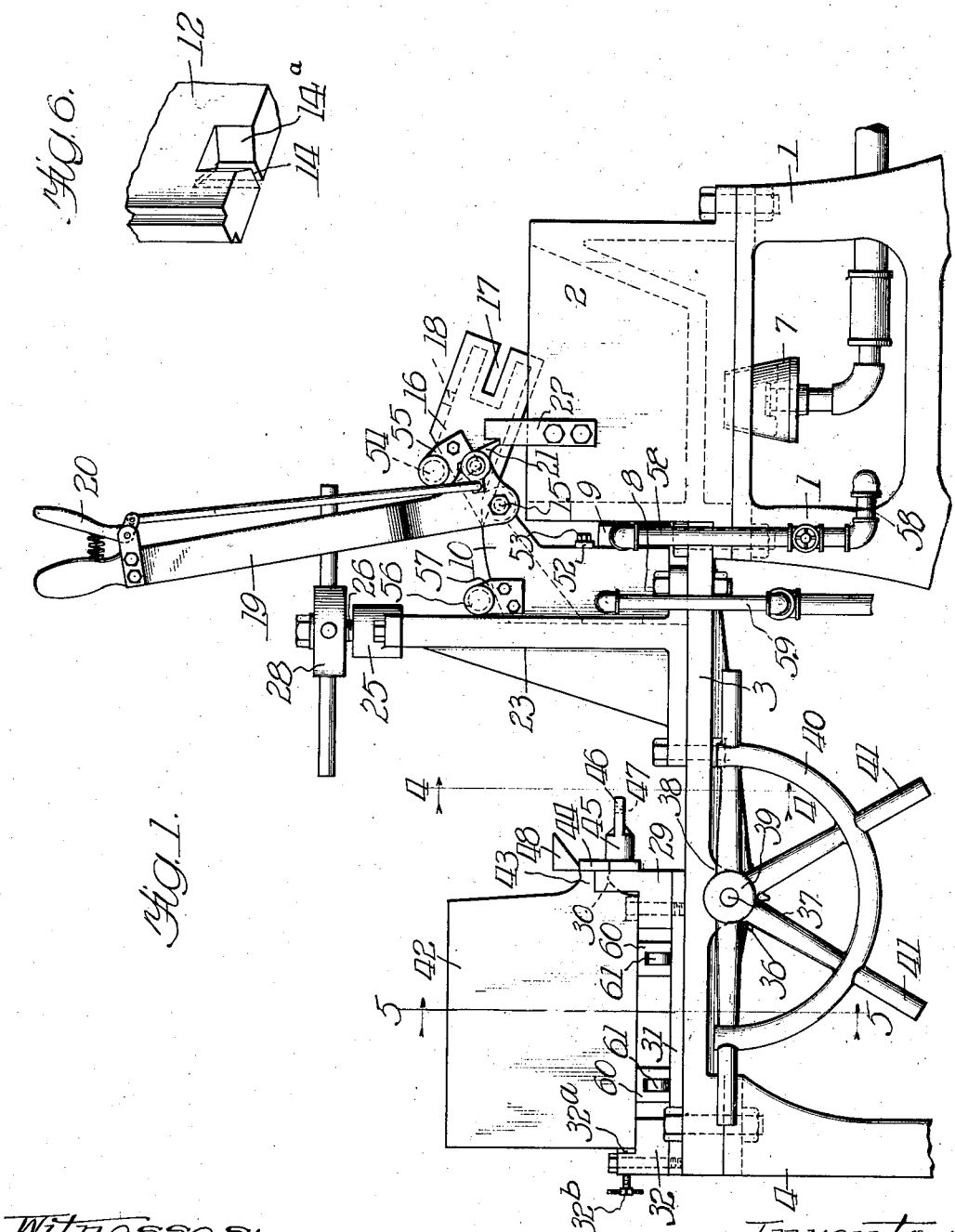

The machine selected for illustration includes, in general, a reservoir for molten lead mounted on a suitable base or support, an extension or table extending from one end of said reservoir and supported in any suitable manner, a traveling carriage sliding in ways on said table, said carriage adapted to carry a plurality of battery plates onto whose ends there is to be cast an integral strap, and intermediate mechanism between the plates and the reservoir for forming a mold and for pouring lead from the reservoir into the mold.

Referring to the drawings, there is shown a suitable support or stand 1, carrying a reservoir 2 for molten lead. Secured to one end of said reservoir by any suitable means such as bolts, is an extension or table 3, supported at its distant end by legs 4.

Figure 3:
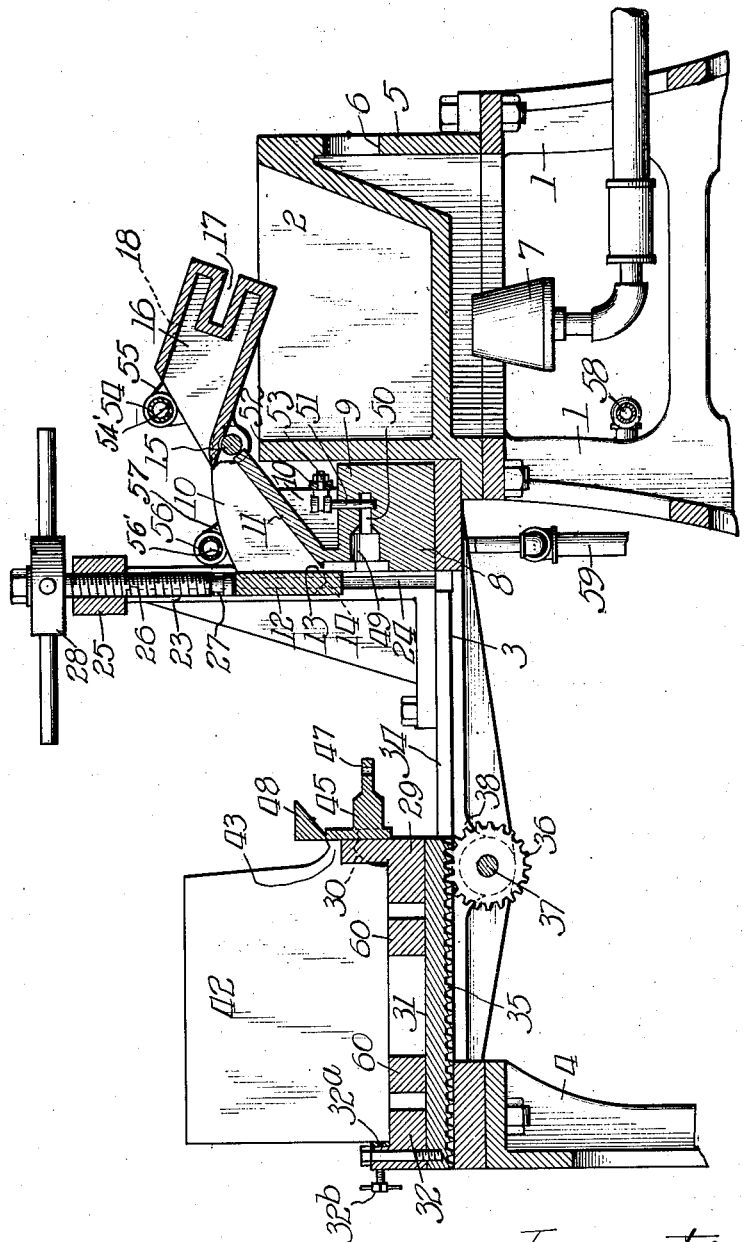
Fig. 3 is a longitudinal central section on line 3—3 of Fig. 2.

The lead reservoir 2 has an additional end wall portion 5 (see Fig. 3), in which there is located an opening 6, which provides an escape for the products of combustion from the burner 7, which latter may be of any suitable type, preferably the ordinary gas burner with an air-mixing device.

An end portion 8 of a mold is preferably located on the table 3 adjacent to the lead reservoir and is secured to said table by any suitable means such as bolts, said end portion being provided with a centrally located projection or block 9, more fully described hereinafter, and substantially parallel end walls 10. These end walls are connected by a diagonal or slanting partition 11, which, together with said walls and the sliding plate or top portion 12 of the mold, form a chute or trough adapted to form a run-way for the molten lead poured from above, as hereinafter described. Said top mold portion 12 does not quite meet the partition 11, so that a narrow slit or opening 13 is left at the bottom of said chute, as will be clearly apparent from Fig. 3. The top mold portion 12 is provided along its under side with a series of slots or grooves 14, seen more particularly in Figs. 4 and 6, each slot being adapted to receive a projecting lug of a battery plate. The slots widen out on the side of the top mold which is away from the battery plates, as at 14ª, so that the cast lead strap, which connects the various lugs, will be provided with reinforcing fillets, as seen more particularly in Fig. 8.

Figure 2:
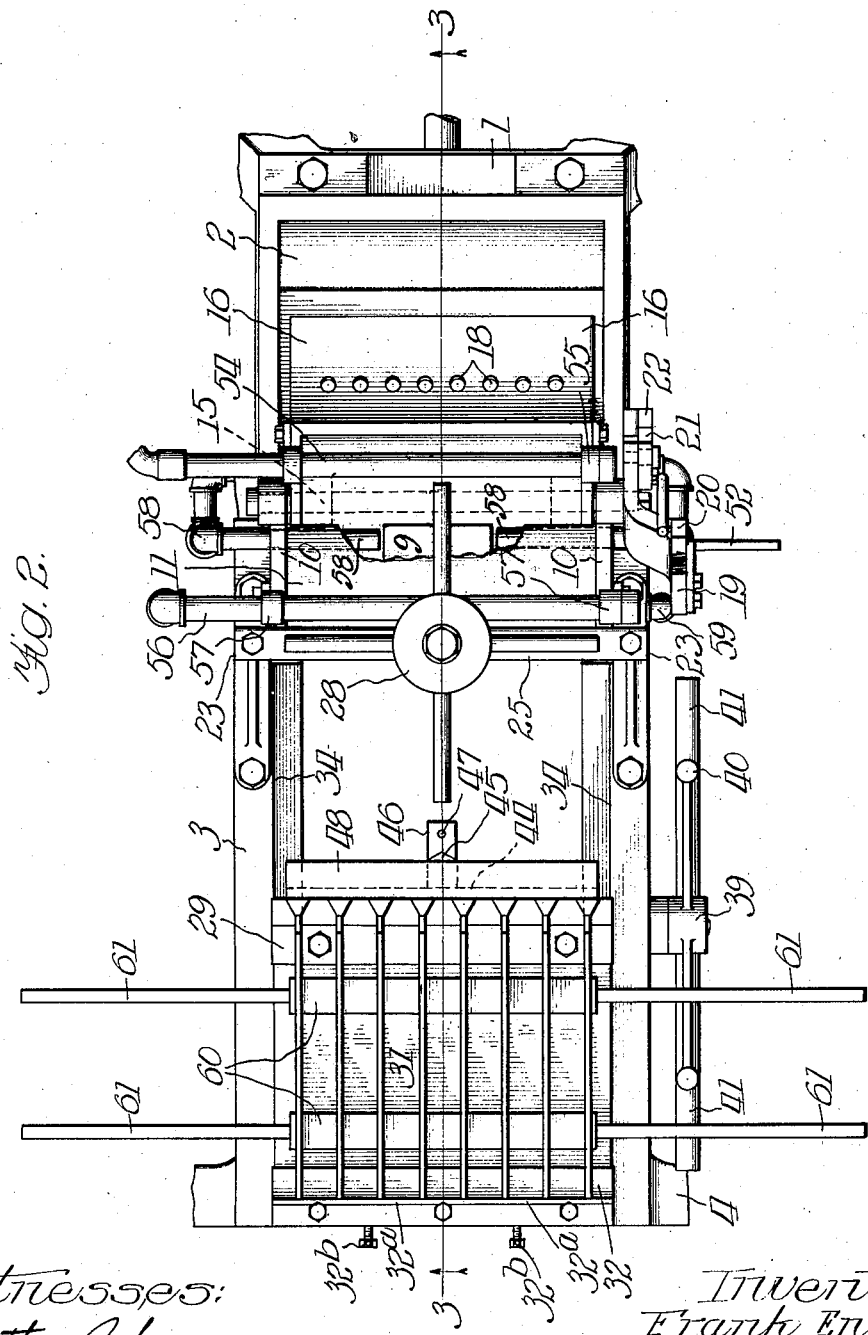
Fig. 2 is a top plan view thereof.

The upper ends of the walls 10 constitute brackets which provide suitable bearings for a rod or bar 15, on which there is rotatably mounted the ladle or bucket 16, adapted to be lowered into the molten lead of the reservoir, and then tilted over so as to pour the lead down the chute referred to above. The ladle 16 is shown as provided with a recessed portion 17 at its base, described in connection with the modification herein illustrated, although I do not limit myself to this construction. In one of the side walls of the ladle, a plurality of holes or openings 18 are located, shown more particularly in Fig. 2. When the bucket is lowered into the molten lead, these holes are lowered well below the surface of the metal so that all the lead, which enters the ladle, enters through these holes, but does not carry with it the usual oxid or dross which is continually forming on the surface of molten lead.

Secured to the ladle 16, in any suitable way, is the operating handle 19, by means of which the ladle may be conveniently dipped into the reservoir and then tilted over to pour out the lead which entered through the holes 18. The handle 19 is shown as provided with a spring latch 20, which operates the pivoted catch 21, adapted to engage a fixed stop 22, secured in any suitable manner to the side of the reservoir. By means of this latch arrangement, the ladle, after being filled with lead, may be lifted above the reservoir and retained in the positions shown in Figs. 1 and 3, but not tipped far enough to cause the discharge of its contents until the mold has been properly adjusted.

Suitable guides 23 are provided for the top mold portion 12, these guides consisting of upright members, bolted or otherwise secured to the table or base 3 and provided with ways 24 in which the ends of said top mold portion are adapted to slide freely. The tops of said guides are connected by the member or yoke 25, through which passes the screw-threaded rod 26, having its lower end turning freely in a block 27, secured to the top mold portion 12. A suitable handwheel 28 is provided, whereby said top mold portion may be readily raised and lowered, and whereby it may be tightly pressed down into position before the casting operation takes place.

The mold into which the molten lead is poured comprises a receptacle, having at one side the end mold portion 8, having at the top the mold portion 12, both described above, and having a bottom mold portion 29 comprising an L-shaped block having slots or grooves 30 in its upper portion, adapted to receive the projecting lugs of the battery plate. This bottom mold portion 29 is suitably secured to the carriage 31 by means of bolts, or in any other suitable manner. A second L-shaped block 32 is secured to the opposite end of said carriage to support the opposite lower corners of said battery plates. An adjustable bar or clamping member 32ª is preferably mounted on the block 32 and adjusted by screws 32ᵇ, although I do not limit myself to this feature. The carriage 31 is provided with projections 33 adapted to slide in suitable ways 34, formed on the base or table 3, as seen more particularly in Fig. 5. A rack 35 is shown as constituting an integral part of said carriage 31 and extends downwardly therefrom, although it is obvious that it need not be integral. The rack 35 meshes with the pinion 36, mounted on the shaft 37, and supported in suitable bearings 38, formed by downwardly extending projections on said table 3. On one end of said rod 37, is located an operating wheel 39, having a rim 40 which forms only a half circle and having spokes or hand grips 41. As seen in Fig. 1, the upper half of the operating wheel is cut away to avoid interference with certain features of the carriage hereinafter described.

In order to close the mold preparatory to the casting operation, a number of storage battery plates 42 are mounted on the supports 29 and 32 and clamped firmly therein by means of the adjustable bar 32ª, with portions of their projecting lugs 43 received in each of the slots 30, in the support or bottom mold portion 29. The battery plates 42 have previously been subjected to a process which renders their surfaces dense and compact and which greatly increases their superficial area, although this feature is not apparent from the drawings. The invention is not limited to the use of plates of any particular configuration or proportions, however, or to plates subjected to any particular prior processes. Upon rotating the operating wheel 39, the carriage 31 is moved to the right of its position, as seen in Fig. 1, until said bottom mold portion 29 bears against the end mold portion 8, whereupon the hand-wheel 28 is turned to lower the top mold portion 12 until said mold portion is firmly pressed down against the bottom mold portion 29, with the upper halves of the projecting lugs 43 fitting within the slots 14 in the lower end of said top mold. With the parts in this position, it will be apparent that the only opening of the mold is the slit 13, and it will be further apparent that the extreme ends of the lugs 43 project into the space in the mold.

Upon filling the ladle 16 with molten lead and tipping the contents thereof into the chute formed by the partition 11 and side walls 10, the lead, which has previously been superheated—that is, heated to a higher degree than merely that necessary to melt it, as I will be hereinafter described,—flows through the slit 13 and assumes the form of the mold to form the cast strap 44, the heat of the lead being sufficient to partially melt the projecting tips of the lugs 43 so that these lugs 43 are combined with the cast strap 44 in such a way as to form a unitary structure.

Figure 8:
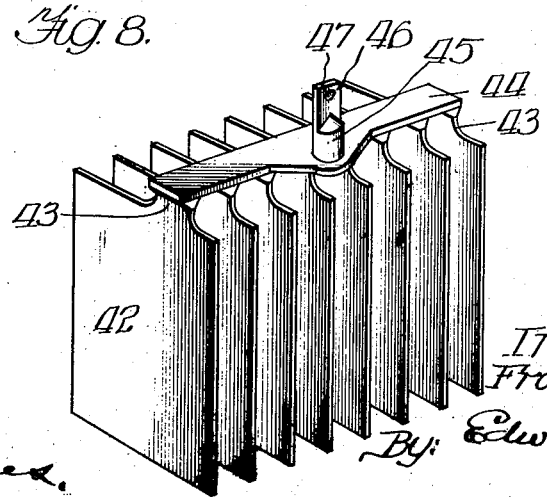
Fig. 8 is a perspective view of a group of plates having a connecting strap cast integrally therewith.

The connecting strap so formed is shown more clearly in perspective in Fig. 8, from which it will be apparent that there is preferably formed, integrally with said strap, a projecting terminal member 45 having a flattened portion 46 provided with a hole 47, adapted to receive a terminal clamping bolt, not shown. In casting the terminal strap and projecting terminal portion, there is a slight excess of lead used, which forms the gate 48, which gate is afterward cut off. The projecting terminal 45 and extension 46, referred to, are formed by virtue of a recess 49 and extension 50 in the central block 9 forming an integral part of the end mold 8 described above (see Fig. 3).

In order to form the hole 47 in the terminal extension 46, a vertically movable pin 51 is provided, carried by the lever 52, pivoted at 53 to part of said end mold portion. It will be apparent that by raising and lowering the handle 52 (see particularly Fig. 4), the pin may be raised to release the terminal member after the casting operation. By operating the hand-wheel 28, the top mold portion 12 may be lifted, whereupon the carriage, and the plates carried thereby, are free to be returned to initial position.

The means for giving to the lead the additional heat referred to above, consists of the pipe 54 supplied with hydrogen, said pipe being secured to the ladle 16 by means of brackets 55 or other suitable supports, from which pipe a number of hydrogen flames are directed through a plurality of holes 54' against the surface of the lead in the ladle, after said ladle has been lifted to its intermediate position, and while the mold is being adjusted in its closed position. These hydrogen flames not only provide the additional heat required, but also burn off all the dross on the surface of the lead, leaving it bright and clean. This superheating of the lead is desirable in order to cause a thorough fusion of the projecting battery-plate lugs with the connecting strap. The pipe 54 may be provided with any suitable flexible connection not shown, so as to readily permit of the movement of the ladle 16.

In order to facilitate the operation of the device, it is desirable to provide means for quickly cooling the larger masses of cast metal, such as the gate 48 and the terminal extension 45. For this purpose, an air-pipe 56 is provided, supported on brackets 57, secured to the side walls 10 of the end mold portion, said pipe being provided with a plurality of small openings, 56', for directing cold air downwardly against the top of the gate after the casting operation. Another cold air pipe 58 is shown more particularly in Fig. 1 as extending horizontally between the reservoir 2 and the end mold portion 8, for the purpose of directing a stream of cold air against the sides of the block 9 for the purpose of quickly cooling the terminal lug 45 and extension 46. One of these pipes 58 is provided for each side of the machine.

Gas pipes 59, having the usual air-mixing nozzles, not shown, are preferably provided for the purpose of directing a flame against the lower ends of each of the opposite walls 10 on the center mold portion 8, for the purpose of heating up the walls of said mold to a sufficient extent to prevent too rapid cooling of the molten metal when it is first poured into the mold, as such cooling might defeat the object of fusing together the lugs and connecting strap.

After the casting operation has taken place, and the parts have been returned to their normal positions as described above, the plates 42, with their connecting strap, are lifted from the supporting blocks 29 and 32, and the gate 48 is cut off, leaving the product shown in Fig. 8. To facilitate lifting the plates, and particularly the lugs 43 from the slots in the mold portion 29, either one or two ejecting means are preferably provided, consisting of a bar or block 60 having a handle 61 at each end, pivoted at 62, seen more particularly in Fig. 5. It will be apparent that by simply pressing down the ends of the handles 61, the block 60 and the entire group of battery plates above said block will be raised a slight amount, sufficient, however, to enable the group of plates to be readily lifted from the carriage. By having the operating wheel 39 cut away, as described above, the manipulation of these ejectors is not interfered with.

Figure 7:
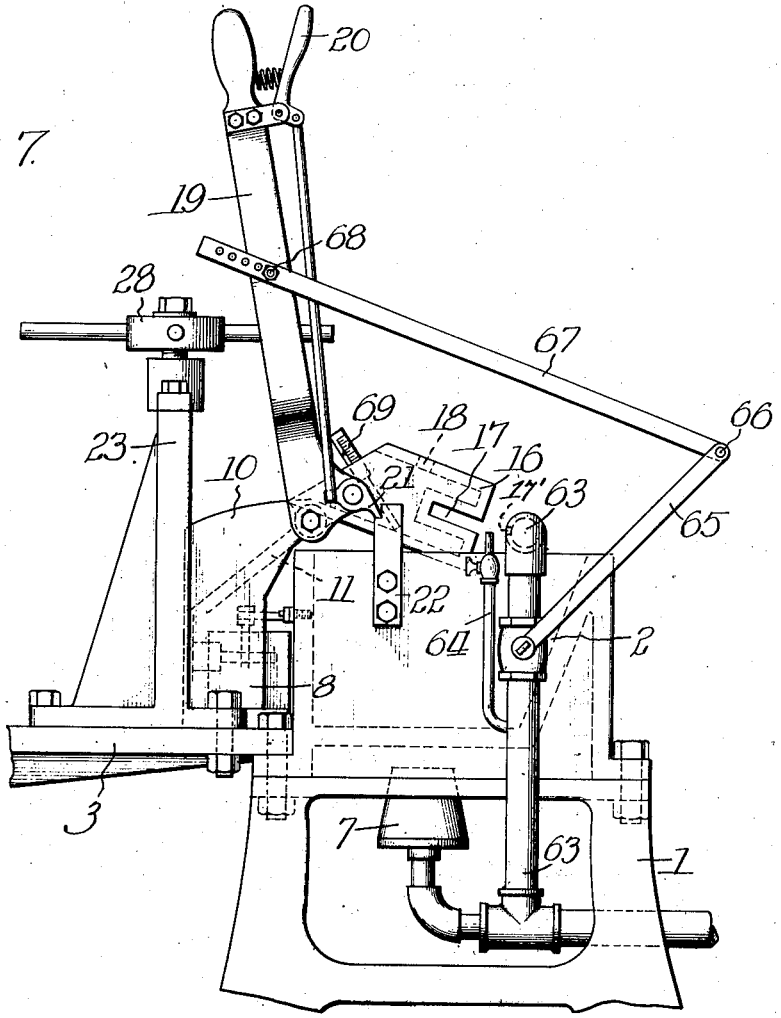
Fig. 7 is an elevation of a modification of part of the machine.

In the modification illustrated in Fig. 7, the various parts, indicated by the same reference characters as those previously used, are the same as the parts heretofore described, the additional reference characters applying only to new parts. In this modification, the lead in the ladle is kept hot by a flame directed into the recess 17 in the bottom of the ladle, rather than by the surface flame previously described. The gas pipe 63 is located parallel to said recess, and has a plurality of holes 17' whereby a plurality of flames may be directed into this recess 17. A pilot light is indicated at 64. The lever 65 is pivoted at 66 to the lever 67, which is in turn bolted at 68 to the main operating lever 19. The operation of the lever 19 causes the proper opening and closing of the valve in the pipe 63, so that the gas flame is directed against the ladle only when the ladle is in its intermediate position. A thermometer 69 may be mounted on the ladle for the purpose of determining the temperature of the lead. Although the arrangement shown in this modification is effective to properly superheat the lead, the arrangement first described is the preferred one, as the lead is not only kept hot, but clean. Of course, it is apparent that a hydrogen flame, for the purpose of cleaning the surface of the lead in the ladle, might be used in connection with this modification, if desired.

The advantages of the construction shown in Fig. 7 are obvious, the effect of having a strap integral with each plate being to reduce the resistance to the lowest point under the circumstances. The union between the lugs and the fillets on the strap is so perfect that, on cutting apart these members in any direction, no joint or opening of any kind can be detected, which is an obvious improvement over straps that have been "burned" to battery plates in the usual manner.

I do not desire to limit myself to the precise details of the process described above, or to the details of the machine selected for carrying out the process, as it is obvious that various changes may be made in both process and machine, without departing from the spirit of the invention.

What I claim as new and desire to secure by Letters Patent of the United States is:—

1. The process of uniting lead battery plates which consists of cleaning molten lead by superheating same and casting said molten lead while in a superheated condition to portions of said plates whereby said plates are integrally united.

2. The process of forming a battery terminal strap integral with a plurality of battery plates, which consists in melting lead in a suitable receptacle, dipping out a portion of said molten lead, superheating said portion and then pouring said superheated lead into a suitable mold which confines said lead in contact with portions of said plates, whereby an integral connecting member is formed between said plates and whereby said member and said plate portions are fused together.

3. The process of casting a terminal strap onto battery plates, which consists in mounting said plates in a suitable rack adjacent a mold, dipping up in a ladle a suitable quantity of molten lead, superheating and cleaning said lead, closing said mold by moving said rack, and the plates carried thereby, against the same, and then pouring said superheated lead into said mold and against certain portions of said plates.

4. The process of casting a terminal lug integral with a battery plate, which consists in cleaning and superheating molten lead by means of a flame directed against the surface of said molten lead, and then pouring said cleaned and superheated lead into a suitable mold which includes a portion of said plate.

5. The process of casting a terminal connecting member onto a storage battery plate, which consists in melting lead in a suitable receptacle, mounting said plate on a movable member which constitutes part of a mold, closing said mold by moving said member against the remainder of the mold, heating the walls of said mold to prevent a too rapid chilling of the casting, superheating a portion of said molten lead, pouring the same into said mold, whereby said molten lead is fused to a portion of said battery plate which projects into said mold, and artificially cooling the heavier portions of said casting in order to reduce to the minimum the period of cooling for the casting as a whole.

6. The process of casting a terminal connecting member on to a storage battery plate which consists in melting and cleaning lead in a suitable receptacle, mounting said plate on a suitable member which constitutes a part of a mold, closing said mold by moving said member against the remainder of the mold, heating the walls of said mold to prevent a too rapid chilling of the casting, superheating a portion of the molten lead to a degree sufficient to melt the lead of the battery plate, pouring the same into said mold, whereby said molten lead coalesces with a portion of said battery plate which projects into said mold, and artificially cooling the heavier portions of said casting in order to reduce to a minimum the period of cooling of the casting as a whole.

In witness whereof, I have hereunto subscribed my name in the presence of two witnesses.

FRANK ENGEL.

Witnesses:
 CARLTON H. WAGNER,
 EDGAR P. REYNOLDS.